US008363939B1

(12) United States Patent
Khosla et al.

(10) Patent No.: US 8,363,939 B1
(45) Date of Patent: Jan. 29, 2013

(54) VISUAL ATTENTION AND SEGMENTATION SYSTEM

(75) Inventors: Deepak Khosla, Camarrillo, CA (US); David Huber, Venice, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1066 days.

(21) Appl. No.: 12/214,259

(22) Filed: Jun. 16, 2008

Related U.S. Application Data

(63) Continuation-in-part of application No. 11/973,161, filed on Oct. 4, 2007, now Pat. No. 8,165,407.

(60) Provisional application No. 60/944,042, filed on Jun. 14, 2007, provisional application No. 60/849,975, filed on Oct. 6, 2006, provisional application No. 60/903,241, filed on Feb. 23, 2007.

(51) Int. Cl.
*G06K 9/00* (2006.01)
(52) U.S. Cl. ......................... 382/173; 382/164; 382/190
(58) Field of Classification Search ........................ None
See application file for complete search history.

(56) References Cited

U.S. PATENT DOCUMENTS

| 6,670,963 B2 | 12/2003 | Osberger |
| 7,680,295 B2 * | 3/2010 | Yoda et al. .................... 382/100 |
| 2005/0047647 A1 | 3/2005 | Rutishauser et al. |
| 2007/0173699 A1 | 7/2007 | Mathan et al. |
| 2007/0236488 A1 | 10/2007 | Mathan et al. |
| 2008/0056611 A1 | 3/2008 | Mathan et al. |

FOREIGN PATENT DOCUMENTS

| WO | WO 03/025859 A1 * | 3/2003 |
| WO | WO 03/093947 | 11/2003 |

OTHER PUBLICATIONS

Walther et al. (Jun. 2005) "Selective visual attention enables learning and recognition of multiple objects in cluttered scenes." Computer Vision and Image Understanding, vol. 100 pp. 41-63.*

Ng et al. (Jun. 2006) "Medical image segmentation using k-means clustering and improved watershed algorithm." Proc. 2006 IEEE Southwest Symp. on Image Analysis and Interpretation, pp. 61-65.*

Fussenegger et al. (Aug. 2004) "Object recognition using segmentation for feature detection." Proc. $17^{th}$ IEEE Int'l Conf. on Pattern Recognition, vol. 3 pp. 41-44.*

Khosla, D. (Sep. 2006) "Biologically-inspired cognitive architecture for integrated learning, action and perception (BICA-LEAP)." HRL Laboratories, LLC. DARPA/IPTO Final Report N00014-05-C-0510.*

Siagian et al. (Jun. 2005) "Gist: A mobile robotics application of context-based vision in outdoor environment." Proc. 2005 IEEE Comp. Sci. Conf. on Computer Vision and Pattern Recognition, pp. 88+.*

(Continued)

*Primary Examiner* — Barry Drennan
(74) *Attorney, Agent, or Firm* — Tope-Mckay & Associates

(57) ABSTRACT

Described is a bio-inspired vision system for attention and object segmentation capable of computing attention for a natural scene, attending to regions in a scene in their rank of saliency, and extracting the boundary of an attended proto-object based on feature contours to segment the attended object. The attention module can work in both a bottom-up and a top-down mode, the latter allowing for directed searches for specific targets. The region growing module allows for object segmentation that has been shown to work under a variety of natural scenes that would be problematic for traditional object segmentation algorithms. The system can perform at multiple scales of object extraction and possesses a high degree of automation. Lastly, the system can be used by itself for stand-alone searching for salient objects in a scene, or as the front-end of an object recognition and online labeling system.

27 Claims, 12 Drawing Sheets

OTHER PUBLICATIONS

Navalpakkam et al. (2006) "An integrated model of top-down and bottom-up attention for optimizing detection speed." 2006 IEEE Comp Sci. Conf. on Computer Vision and Pattern Recognition, vol. 2 pp. 2049-2056.*

Ray et al. (1999) "Determination of number of clusters in K-Means clustering and application in colour image segmentation." Proc. 4$^{th}$ Int'l Conf. on Advances in Pattern Recognition and Digital Techniques, pp. 137-143.*

V. Navalpakkam and L. Itti, "Modeling the influence of task on attention," Vision Research, 45: 205-231, 2005.

V. Navalpakkam and L. Itti, "An integrated model of top-down and bottom-up attention for optimal object detection," In: Proc. IEEE Conference on Computer Vision and Pattern Recognition (CVPR), 1-7, 2006.

D. Walther, et al, "Attentional selection for object recognition—a gentle way," Lecture Notes in Computer Science 2525: 472-479, 2002.

B. Draper and A. Lionelle, "Evaluation of selective attention under similarity transforms," In Workshop on Performance and Attention in Computer Vision, Graz, Austria, Apr. 2003.

Y. Sun and R. Fisher, "Hierarchical selectivity for object-based visual attention," Submitted to Artificial Intelligence, 2004.

F. Orabona, et al., "Object-based visual attention: a model for a behaving robot," in 3rd International Workshop on Attention and Performance in Computational Vision (in CVPR 2005), San Diego, CA, Jun. 2005.

L. Itti and C. Koch, A saliency-based search mechanism for overt and covert shifts of visual attention,: Vision Research, 40: 1489-1506, 2000.

J.M. Wolfe, "Visual Search in Continuous, Naturalistic stimuli," Vision Research, 34: 1187-1195, 1994.

L. Itti, et al., "A model of saliency-based visual attention for rapid scene analysis," IEEE Transactions on Pattern Analysis and Machine Intelligence, 20, 1254-1259, 1998.

B.J. Scholl, "The State of the Art," Cognition 80: 1-46, 2001.

R. Eckhorn, et al., "Coherent Oscillations: A mechanism of feature linking in the visual cortex?" Biological Cybernetics, 60: 121-130, 1988.

C.M. Gray, et al., "Oscillatory responses in cat visual cortex exhibit intercolumnar synchronization which reflects global stimulus properties," Nature 338: 334-336, 1989.

E. Niebur and C. Koch, "Control of Selective visual attention: modeling the 'where' pathway," in D. Touretzky, M. Mozer, and M. Hasselmo, Neural Information Processing Systems (NIPS 8), 802-808, Cambridge, MA, MIT Press. 1996.

S.A. Nane, et al., "Columbia Object Image Library (COIL-100)," Technical Report CUCS-006-96, Feb. 1996.

University of California, San Diego Complex Systems and Cognition Laboratory, CSCLAB Image Database http://csclab.ucsd.edu/labeledimages.php. 2006.

Andoni A., et al., "Near-Optimal Hashing Algorithms for Near Neighbor Problem in High Dimensions," Proceedings of the Symposium on Foundations of Computer Science (FOCS'06), 2006.

Bentin, S., et al., "Electrophysiological studies of face perception in humans," Journal of Cognitive Neuroscience, 8, 551-565, 1996.

Berg A., "Shape matching and object recognition," Ph.D. thesis, UC Berkeley, Computer Science Division, Berkeley, CA, Dec. 2005.

Berka, C., et al., "Evaluation of an EEG-workload model in an aegis simulation environment" in Proceedings of SPIE Defense and Security Symposium, 90-99, 2005.

Bhattacharyya, R., et al., "Optimal image ordering for rapid serial visual presentation using electroencephalography," Presented at Society of NeuroScience (SfN) annual meeting, Chicago, 2009.

Carpenter G.A., et al., "A massively parallel architecture for a self-organizing neural pattern recognition machine," Computer Vision, Graphics, and Image Processing, 37, 54-115, 1987.

Carpenter G.A., et al., "The what-and-where filter a spatial mapping neural network for object recognition and image understanding," Computer Vision and Image Understanding, 69, 1-22, 1998.

Carpenter G.A., "Default ARTMAP," in Proc. of the International Joint Conference on Neural Networks (IJCNN'03), 1396-1401, 2003.

Carpenter G.A., et al., "Self-organizing information fusion and hierarchical knowledge discovery: a new framework using ARTMAP neural networks," Neural Networks, 18, 287-295, 2005.

Cowell, et al., "Construction and validation of neurophysio-technological framework for imagery analysis," in J.Jacke (Ed.): Human-Computer Interaction, Part II, HCII 2007, LNCS 4551, pp. 1096-1105, 2007, © Springer-Verlag Berlin Heidelberg.

Richard P. Wildes, "A measure of motion salience for surveillance applications" in Proc. IEEE Int'l Conf. Image Processing,1998.

http://en.wikipedia.org/Travelling_salesman_problem.

Eimer, M., "Does the face-specific N170 component reflect the activity of a specialized eye processor?" Neuroreport, 9, 2945-2948, 1998.

Fabre-Thorpe, M., et al., "A limit to the speed of processing in Ultra-Rapid visual categorization of novel natural scenes," Journal of Cognitive Neuroscience, 13, 171-180, 2001.

Field D.J., "Relations between the statistics of natural images and the response properties of cortical cells," J. Opt. Soc. Am. A., 4: 2379-2394, 1987.

Fei-Fei L., et al., "Learning generative visual models from few training examples: an incremental Bayesian approach tested on 101 object categories," CVPR 2004, Workshop on Generative-Model Based Vision, 2004.

Gerson, A.D., et al., "Cortically coupled computer vision for rapid image search," IEEE Transactions on Neural Systems and Rehabilitation Engineering, 14(2): 174-179, Jun. 2006.

Gladwell, M., "Blink: the power of thinking without thinking," 1st ed. Little, brown and company: Time Warner Book Group, New York, 2005, pp. 18-47.

Gutin, G., et al., "Traveling salesman should not be greedy: domination of analysis of greedy-type heuristics for the TSP," Discrete Applied Mathematics, 117: 81-86, 2002.

Zang H., et al., "SVM-KNN: Discriminative nearest neighbor classification for visual category recognition," CVPR 2006.26. Vazirani, V., "Approximation algorithms," Springer-Verlag, Berlin, Germany, p. 32, 2004.

Hopf, J.-M., et al., "Localizing visual discrimination processes in time and space," The American Physiological Society, 88, 2088-2095, 2002.

Yamaguchi, S., et al., "Cerebral Asymmetry of the 'Top-down' allocation of attention to global and local features," The Journal of Neuroscience, 20, 1-5, 2000.

Vogel, E.K., et al., "The Visual NI Component as an index of a discrimination process," Psychophysiology, 2000.

Itti L., et al., "Bayesian Surprise Attracts Human Attention," Vision Research 49: 1295-1306, 2008.

Itti, L., et al., "Computational Modeling of Visual Attention," Nature Reviews Neuroscience, 2, 194-203, 2001.

Itti, L., "Quantifying the Contribution of low-level saliency to human eye movements in dynamic scenes," Visual Cognition, 12, 1093-1123, 2005.

Keysers, C., et al., "The Speed of Sight," Journal of Cognitive Neuroscience, 13 (1), 90-101, 2001.

Khosla D., et al., "Bio-Inspired Visual Attention and Object Recognition," In: Proc. SPIE Defense, Security, and Sensing, 6560, 656003, 2007.

Khosla, D., et al., "A bio-inspired system for spatio-temporal recognition in static and video imagery," Proc. SPIE 6560, 656002, 2007.

Koch C., et al., "Shifts in selective visual attention: towards the underlying neural circuitry," Human Neurobiology, 4: 219-227, 1985.

Lazebnik S., et al., "Beyond Bags of Features: spatial pyramid matching for recognizing natural scene categories," In: Proc. IEEE Conference on Computer Vision and Pattern Recognition (CVPR), 2006.

Ling, H., et al., "Diffusion distance for histogram comparison," IEEE Computer Society Conference on Computer Vision and Pattern Recognition (CVPR), 2006.

Medasani, S., et al., "Possibilistic particle swarms for optimization," Proceedings 5673 of SPIE/IST Symposium on Electronic Imaging, 2005.

Medasani, S., et al., "Active learning system for object fingerprinting," International Joint Conference on Neural Networks, 2004.

Morrison, D., et al., "Semantic clustering of images using patterns of relevance feedback," in Proceedings of the 6th International Workshop on Content-based Multimedia Indexing (CBMI 2008), London, UK.

Sun, Y., et al., "Probabilistic judgment by a coarser scale: behavioral and ERP evidence," in Proceedings of the Twenty-sixth Annual meeting of the Cognitive Science Society, 2004.

Vazirani, V., "Approximation Algorithms," Springer-Verlag, Berlin, Germany. pp. 32-33 (2004).

Thorpe, S., et al., "Speed of processing in the human visual system," Nature, vol. 381, pp. 520-522, 1996.

Navalpakkam V., et al., "Sharing resources: buy attention, get recognition," In: Proc. International Workshop on Attention and Performance in Computer Vision (WAPCV'03), Graz, Austria, Jul. 2003.

Navalpakkam, V, et al., "Search goal tunes visual features optimally," Neuron, 53, 605-617, 2007.

Smeulders, A., et al., "Content-based image retrieval at the end of the early years," IEEE Transactions on PAMI, 22(12): 1349-1380, 2000.

Serre T., et al., "Object recognition with features inspired by visual cortex," in Proceedings of the IEEE conference on computer vision and pattern recognition (CVPR), San Diego, CA, Jun. 2005.

Owechko, Y., et al., "A swarm-based volition/attention framework for object recognition," IEEE Conference on Computer Vision and Pattern Recognition, San Diego, 2005.

Owechko, Y., et al., "Cognitive swarms for rapid detection of objects and associations in visual imagery," IEEE Swarm Intelligence Symposium, 2005.

Peters, R.J., et al, "Beyond bottom-up; Incorporating task-dependent influences into computational model of spatial attention," in: Proc. IEEE Conference on Computer Vision and Pattern Recognition (CVPR), 2007.

Rogowitz, B.E., et al., "Perceptual image similarity experiments," Proceedings of SPIE, 3299: 576-590, 1998.

* cited by examiner

VISUAL ATTENTION AND SEGMENTATION SYSTEM

PRIORITY CLAIM

The present application is a Continuation-in-Part patent application, claiming the benefit of priority of U.S. Provisional Application No. 60/944,042, entitled, "A Bio-Inspired System for Visual Object-Based Attention and Segmentation," filed on Jun. 14, 2007, and also claiming the benefit of priority of U.S. patent application Ser. No. 11/973,161, filed Oct. 4, 2007 now U.S. Pat. No. 8,165,407, entitled "Visual attention and object recognition system," which claims priority to two provisional patent applications; U.S. Provisional Application No. 60/849,975, filed on Oct. 6, 2006, entitled, "A Bio-Inspired Vision System for Object Recognition," and U.S. Provisional Application No. 60/903,241, filed on Feb. 23, 2007, entitled, "A Bio-Inspired Vision System for Object Recognition."

FIELD OF INVENTION

The present invention relates to an object recognition system and, more specifically, to a bio-inspired visual attention and object segmentation system that can (1) compute attention for a natural scene and attend to regions in a scene in their rank of saliency, (2) extract the boundary of an attended proto-object based on feature contours to segment the attended object, and (3) if biased, can boost the attention paid to specific features in a scene, such as those of a desired target object in static and video imagery.

BACKGROUND OF INVENTION

When a person enters a room that the person has never seen before, the person's visual system immediately begins to parse the scene. The eyes move (saccade) to regions of the room that contain objects of interest. As the objects of interest are found, the brain immediately begins classifying them. If the person sees something new and unrecognized, the person might ask a friend what the item is called. While this task is trivial for most humans to accomplish, it has proven to be a very challenging problem for computers. Because human performance far exceeds that of the best machine vision systems to date; building an artificial system inspired by the principles underlying human vision is an attractive option. However, existing bio-inspired systems have not been robustly tested on real-world image datasets and are not suited for real-time applications. Additionally, existing attention and segmentation systems are slow, inefficient, perform inaccurate or arbitrary segmentation of a scene, and lack automation so that they require a user's constant supervision. The majority of vision-based methods have limited application to natural scenes and cannot accommodate for subtle changes in a scene, such as the natural lighting. Such accommodations would require extensive timing of the method to each particular scene and would require constant user maintenance to properly segment an object. Additionally, current systems implement object segmentation mechanisms that only work at a single scale, do not have the ability to break apart an image into smaller objects based on feature density, and do not have the ability to join smaller regions of similar features into larger objects with defined boundaries.

Recently, a number of researchers have shown interest in systems that compute the saliency of a scene. Two particular theories have emerged from this interest: (1) attention that focuses on features at specific loci in the scene; and (2) attention that focuses on the saliency of specific objects or colored "blobs" in a scene. These methods are called feature-based and object-based attention, respectively. Researchers have found evidence that supports each of these, and both methods have exhibited utility for a variety of applications.

Feature-based attention works at the pixel level and bases computation of attention on the saliency of a specific location within the scene. The attention work of Itti and Koch employs such an approach, which computes attention by constructing a saliency map from a set of biologically-inspired features extracted from the image (see literature reference no. 1, below in the Detailed Description). The algorithm breaks apart the image into a set of Gaussian pyramids corresponding to color, intensity, and orientation at a series of scales, which are combined across scales and merged into the saliency map. The system attends to the point that corresponds to the maximum value in the saliency map, applies inhibition of return to that location, and shifts to the next most salient point. This process continues until the program attends to a maximum number of locations, or the user terminates the program.

A significant problem with Itti's method is its inefficiency, in spite of the inhibition-feedback mechanism where the algorithm routinely returns to previously attended locations if a better point is not found. This often results in a few locations receiving almost all of the attention, while other, less conspicuous regions receive none. This is an undesired effect for the purposes for which the present invention is intended. To obtain a complete analysis of a scene, the algorithm should attend to every location. The Itti and Koch algorithm lacks the type of queuing system required to efficiently attend to every location in the image. Some groups have also found that this algorithm does not exhibit invariance to the orientation of a scene, for example, when the algorithm analyzes the same image twice; one being slightly rotated relative to the other, it returns dramatically different salient regions for each (see literature reference no. 2). This is an undesired effect, as invariance to the image orientation is critical. Itti's attention system was outlined in detail in U.S. Pat. No. 6,670,963.

A number of modifications have been made to the original algorithm that allow for top-down biasing of the attention mechanism to pay more attention to regions that exhibit certain desired features (see literature reference nos. 3 and 4). These methods apply a series of weights to the feature maps that directly affect the construction of the saliency map and tilt the attention system in favor of particular features. One method computes the feature weights through a training regimen, in which the system observes a series of target objects and determines which features provide a common thread between them, expressed as the feature relevance. Because this top-down biasing system must be applied through the aforementioned Itti and Koch algorithm, the overall method shares the same limitations previously discussed.

An extension of Itti's attention mechanism was developed by Walther et al., which segments the region around the most salient point, returning a region of interest instead of a simple point in the image (see literature reference no. 5). To do this, a saliency map is computed for an image and the most salient point in the image is located. Next, the original feature maps are examined and the feature that contributed the most to the saliency at the most salient point is determined. The algorithm processes the strongest feature map around the most salient point, employing a flooding and thresholding algorithm to determine the extent of the strongest feature. The program computes the boundary of the resulting map and returns it as the region of interest. As with the original attention algorithm, this method continues to shift its attention around the image until a predetermined number of regions have been visited, or the user stops the algorithm.

This method, however, exhibits a number of critical weaknesses. In particular, the segmentation employed, while feature-based, appears arbitrary when actually applied and does not correspond to actual objects. In cases where there is clutter or no distinct feature boundaries, this method often fails to clearly segment regions of interest and the algorithm often ignores parts of objects or cleaves them in half. Also, this method demonstrates the same inefficiency that the Itti algorithm displays pertaining to overlapping salient regions and continuously revisiting previously attended spaces in the image. This work is described in United States Patent Publication Number 2005/0047647.

In contrast to feature-based attention mechanisms, object-based attention mechanisms focus on tangible objects within a scene, compute attention based on the saliency of the objects composing the scene, and determine which object "stands out" from the others. Sun and Fisher proposed an object-based attention mechanism, in which they compute attention for a set of objects within a manually segmented image at multiple scales (see literature reference no. 6). For example, at a coarse scale, a canoe on water can be segmented out; at a finer scale, the canoe and each passenger on the canoe can be segmented. The algorithm computes the saliency of each object based on features extracted from the scene and shifts attention between scales and between objects. The algorithm is limited, however, in that it requires that the scene be manually segmented before the attention can be computed. The inability to automatically segment the scene dramatically reduces the utility of that method. Not only is manual segmentation of a scene in this manner a tedious process, but it effectively eliminates any chance that the algorithm could be used to analyze foreign or novel imagery, such as that used for surveillance, since it requires that one have prior access to the images.

Orabona et al. developed an object-based approach that does not require manual segmentation (see literature reference no. 7). This method converts the input image into a log-polar representation and computes three feature maps, corresponding to receptive fields with red-center and green-surround, green-center and red-surround, and blue-center with yellow-surround. In addition to using the feature maps to compute the saliency of an object within the image, the algorithm processes the feature maps to find the feature contours and then combines these contour maps into a master feature map.

A watershed flooding algorithm is applied to the master feature map, which segments the image into "proto-objects," corresponding to regions with uniform features. The system computes the saliency of a given proto-object as the magnitude of a vector whose elements correspond to the difference between the average feature densities of the proto-object and a rectangular region surrounding it, for a given feature. The system shifts attention between regions in the order of saliency, and applies inhibition to previously attended regions. Also proposed by Orabona et al. was a simple top-down mechanism that involves computing the saliency as the weighted sum of the top-down and bottom-up elements.

However, for practical applications, the implementation of the watershed algorithm over-segments the scene into regions that encode for small fragments of objects. This problem becomes overwhelmingly clear in situations of natural lighting, where objects of a single color exhibit hue gradients across the object. This method also uses a small feature set and does not treat the intensity of the image as a separate feature which limits the ability of the algorithm to find complex feature contours. The system of Orabona et al. can be extended to more complicated scenes with natural lighting but would require extensive tuning of the watershed threshold to elicit even a marginal improvement. Also, the system only works at a single scale. Finally, the use of the log-polar transform of the scene as input creates an undesired blind spot for object boundaries near the center of the image. The log-polar transform spreads out objects near the middle of the scene, blurring the object boundaries. This obscures the feature contrast and makes it difficult for the edge-detection algorithm to find a feature contour. Since the watershed algorithm can only process closed feature contours, these objects are ignored, which opposes the preferred behavior of attending to all objects.

Thus, a continuing need exists for a visual attention and object segmentation system that can compute attention for a natural scene and attend to regions in a scene based on saliency rankings, extract the boundary of an attended proto-object based on feature contours to segment the attended object, and, if biased, can boost the attention paid to specific features in a scene, such as those of a desired target object in static and video imagery. Moreover, the system should perform at multiple scales of object extraction and possess a high degree of automation, requiring only minor parameter adjustment by the user to consider an entire class of scenes and account for subtle feature changes that can be caused by natural lighting in a scene when performing object segmentation.

SUMMARY OF INVENTION

The present invention relates to a bio-inspired vision system for object-based attention and segmentation. The system comprises a feature extraction module that is configured to receive an image representing a scene with an object in the scene and generate a feature map corresponding to specific visual features in the scene. A feature edge detection module is included that is configured to extract edge information from the feature map and generate an edge map. Also included is a watershed module. The watershed module is configured to generate proto-objects based on the edge map. The system also uses a saliency module that is configured to compute a saliency of each proto-object and rank the proto-objects relative to other proto-objects in terms of their saliency. Additionally, a region growing module is configured to compute a feature boundary for the proto-object with the highest saliency and a list of pixels in the image that constitutes the proto-object feature boundary. The growing module then outputs the pixels confined by the feature boundary as an extracted object.

In another aspect, the present invention further comprises a top-down biasing module that is configured to assign a given weight to each feature of the object, the weight being used by the saliency module in computing the saliency.

The present invention also includes an object recognition module that is configured to receive the extracted object and associate a label with the extracted object to classify the object, whereby a user can use the vision system to classify an object.

Additionally, the system includes an online labeling module that is configured to alert a user if the extracted object is an unknown object and prompt the user to input a label for the unknown object.

Further, the edge-detection module includes an edge threshold, whereby changing the edge threshold varies a number of watershed-regions being generated by the watershed module.

Finally, as can be appreciated by one skilled in the art, the present invention also comprises a method and computer program product. The method comprising acts of performing the operations described herein, with the computer program product comprising instruction means for causing a computer to perform the operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
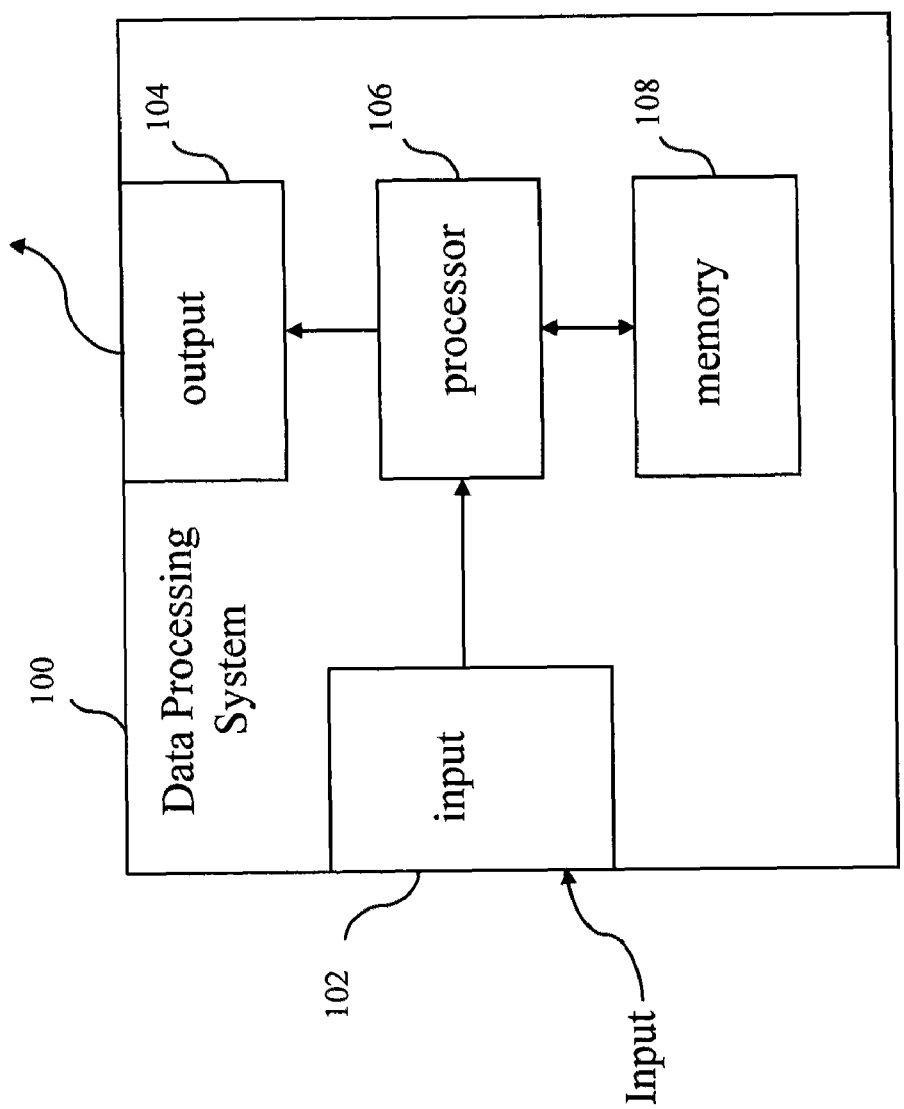
FIG. 1 is a block diagram illustrating components of a vision system according to the present invention.

The present invention relates to an object recognition system and, more specifically, to a bio-inspired vision system that can (1) compute attention for a natural scene and attend to regions in a scene in their rank of saliency, (2) extract the boundary of an attended proto-object based on feature contours to segment the attended object, and (3) if biased, can boost the attention paid to specific features in a scene, such as those of a desired target object in static and video imagery.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Following the list of cited references, a description of various principal aspects of the present invention is provided. Subsequently, an introduction provides the reader with a general understanding of the present invention. Next, details of the present invention are provided to give an understanding of the specific aspects. Additionally, experimental results are presented to demonstrate the efficacy of the present invention. Finally, a conclusion is provided as a synopsis of the present invention.

(1) List of Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number.

1. L. Itti and C. Koch, "A saliency-based search mechanism for overt and covert shifts of visual attention," *Vision Research* 40: 1489-1506, 2000.
2. B. Draper and A. Lionelle, "Evaluation of Selective Attention under Similarity Transforms," in *Workshop on Performance and Attention in Computer Vision*. Graz, Austria, April 2003.
3. V. Navalpakkam and L. Itti, "Modeling the Influence of Task on Attention," *Vision Research* 45: 205-231, 2005.
4. V. Navalpakkam, and L. Itti, "An integrated model of top-down and bottom-up attention for optimal object detection," in *Proc. IEEE Conference on Computer Vision and Pattern Recognition (CVPR)*, 1-7, 2006.
5. D. Walther, L. Itti, M. Riesenhuber, T. Poggio, and C. Koch, "Attentional Selection for Object Recognition—a Gentle Way" Lecture Notes in *Computer Science* 2525: 472-479, 2002.

6. Y. Sun and R. Fisher, "Hierarchical Selectivity for Object-based Visual Attention," submitted to *Artificial Intelligence*, 2004.
7. F. Orabona, G. Metta, and G. Sandini, "Object-based Visual Attention: A Model for a Behaving Robot." in *3rd International Workshop on Attention and Performance in Computational Vision (in CVPR* 2005), San Diego, Calif., June 2005.
8. L. Itti, C. Koch, and E. Niebur, "A Model of Saliency-Based Visual Attention for Rapid Scene Analysis," *Institute of Electrical and Electronics Engineers (IEEE) Transactions on Pattern Analysis and Machine Intelligence* 20, 1254-1259, 1998.
9. J. M. Wolfe, "Visual Search in Continuous, Naturalistic Stimuli," *Vision Research* 34: 1187-1195, 1994.
10. E. Niebur and C. Koch, "Control of Selective Visual Attention: Modeling the 'Where' Pathway," in D. Touretzky, M. Mozer, and M. Hasselmo, "Neural Information Processing Systems (NIPS 8)," 802-808, Cambridge, Mass., MIT Press. 1996.
11. R. Eckhorn, R. Bauer, W. Jordan, M. Brosch, M. Kruse, W. Munk, and H. J. Reitboeck, "Coherent Oscillations: A Mechanism of Feature Linking in the Visual Cortex?" *Biological Cybernetics* 60: 121-130, 1988.
12. C. M. Gray, P. Konig, A. K. Engel, and W. Singer, "Oscillatory Responses in Cat Visual Cortex Exhibit Intercolumnar Synchronization Which Reflects Global Stimulus Properties," *Nature* 338: 334-336, 1989.
13. S. A. Nene, S. K. Nayar, and H. Murase, "Columbia Object Image Library (COIL-100)," Technical Report No. CUCS-006-96, dept. Comp. Science, Columbia University, 1996.
14. B. J. Scholl, "Objects and Attention: The State of the Art," *Cognition* 80: 1-46, 2001.
15. University of California, San Diego Complex Systems and Cognition Laboratory (CSCLAB) Image Database, http://csclab.ucsd.edu/labeledimages.php, 2006.

(2) Principal Aspects

The present invention has three "principal" aspects. The first is a vision system for object recognition. The vision system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instruction means stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting the components of the vision system of the present invention is provided in FIG. 1. The vision system 100 comprises an input 102 for receiving information from at least one sensor for use in detecting an object a scene. Note that the input 102 may include multiple "ports." Typically, input is received from at least one sensor, non-limiting examples of which include video image sensors and still image sensors (such as cameras). An output 104 is connected with the processor for providing information regarding the presence and/or identity of object(s) in the scene to other systems in order that a network of computer systems may serve as an image processing and object recognition system. Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software that are to be manipulated by commands to the processor 106.

Figure 2:
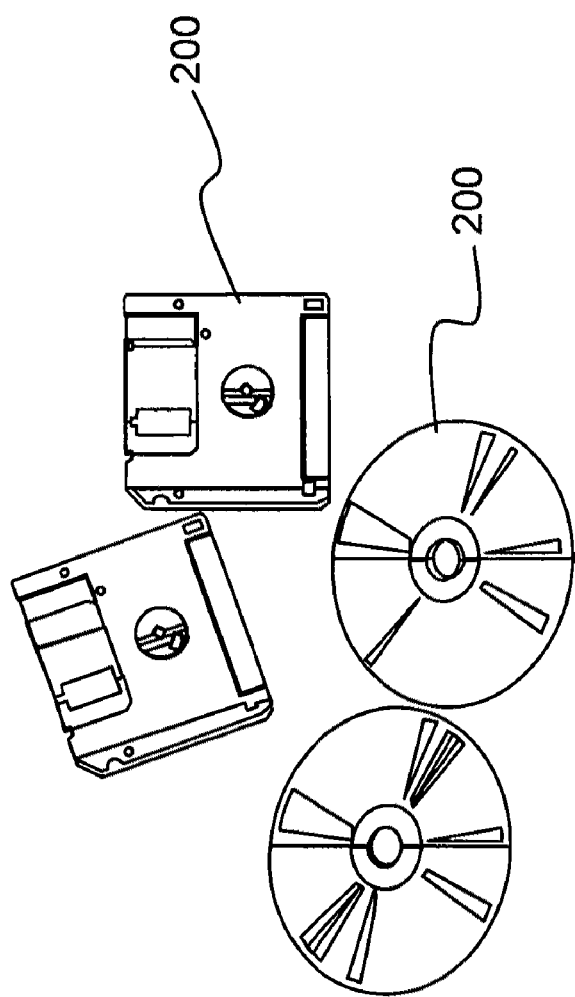
FIG. 2 is a computer program product according to the present invention.

An illustrative diagram of a computer program product embodying the present invention is depicted in FIG. 2. The computer program product 200 is depicted as an optical disk such as a CD or DVD. However, as mentioned previously, the computer program product generally represents computer-readable instruction means stored on any compatible computer-readable medium. The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, or a flash drive.

(3) Introduction

This invention describes a system of human-like attention and object segmentation that can (1) compute attention for a natural scene and attend to regions in a scene in their rank of saliency, (2) extract the boundary of an attended proto-object based on feature contours to segment the attended object, and (3) if biased, can boost the attention paid to specific features in a scene, such as those of a desired target object in static and video imagery. The system uses a series of modular algorithms that are motivated by findings in neuroscience, psychology, and cognitive science and are supported by data from human psychophysics, Gestalt psychology, and primate neurophysiology.

The invention is novel in its modular and stepwise approach to the problems of attention and region extraction, its application of a flooding algorithm to break apart an image into smaller proto-objects based on feature density, and its ability to join smaller regions of similar features into larger proto-objects. Because of the originality of the approach, many complicated operations can be carried out by the system in a very short time, approaching real-time.

While many techniques for attention and segmentation exist, such techniques often exhibit handicaps such as slowness, inefficiency, inaccuracy or seemingly arbitrary segmentation of the scene, or a lack of automation that requires the user's constant supervision. The current invention overcomes such disadvantages and is robust; it is engineered to function over a broad range of situations and can be applied to any scene with minimal tuning from the user. The attention algorithm works efficiently and the segmentation algorithm is able to cope with scenes containing complex lighting and shading conditions, so that the integrity of an object boundary is maintained, and the segmentation boundary is close enough to the object to minimize background noise that can lead to misclassification of the object.

The present system is able to adjust between scales, to extract large objects or textures and then "zoom in" to examine the constituent parts of the object. This is critically important in object recognition, because when the recognizing algorithm cannot identify an object, the attention algorithm can then look at the individual parts of the large object, and the identification system can attempt to construct a representation of the larger object based on its parts.

The current invention allows a user to identify regions of a scene of potential importance and extract the region data for processing by an object recognition and classification algorithm. It may be applied to any application that monitors a scene for the purpose of finding interesting or unusual regions or occurrences. For example, it can be employed to search and rescue operations or to surveillance applications where any activity is an unexpected occurrence, such as in a desert, mountain range or on the open sea.

The attention process can be performed in a bottom-up manner or a directed, top-down manner which will assign a preference to certain features over others. The attention process also employs visual object recognition and scene understanding to extract regions of interest for identification. One can apply this system to any static scene, for example, a still photograph or an image captured from video. This attention and object segmentation system can be used stand-alone or, as a front-end to a larger system that includes object recognition, online labeling, and scene understanding modules.

(4) Details of the Invention

The current invention is a bio-inspired system for attention and object segmentation and extraction that computes a saliency map of proto-objects in a scene, and performs ordered segmentation of the salient objects. The attention and segmentation system includes both feature-based and object-based saliency methods in the field of attention. Saliency is defined as a function of contrast between an object's features and those of its immediate surroundings upon which the objects can be "ranked" according to their prominence in the image. The present invention can be applied to a large range of natural scenes exhibiting a variety of lighting conditions that cause problems for other attention systems.

Figure 3:
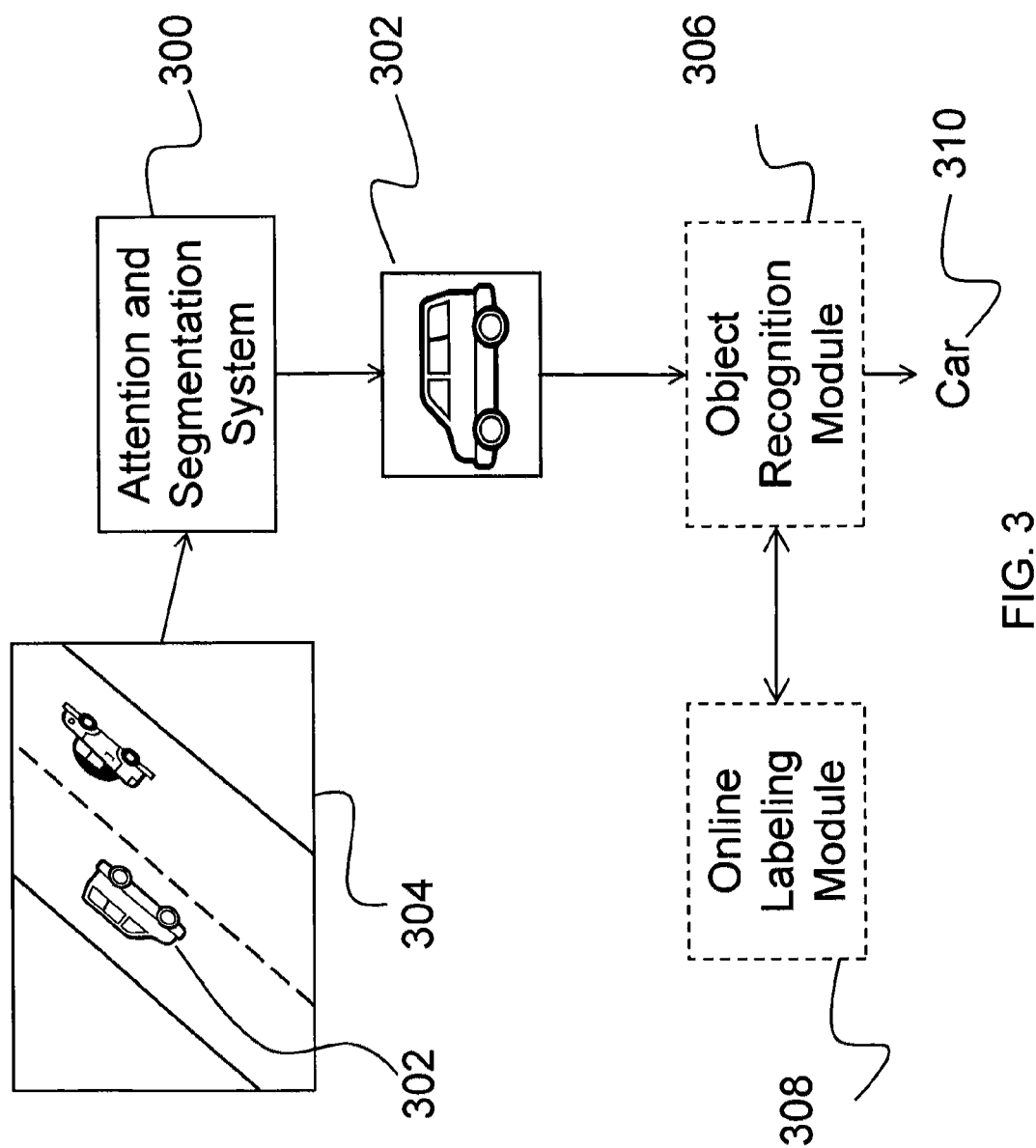
FIG. 3 is a schematic flow chart, including optional modules, according to the present invention.

As shown in FIG. 3, the attention and object segmentation system 300 finds objects 302 in a scene 304 in the order of their salience and segments them from the scene 304. As earlier noted, the attention and object segmentation system can be used stand-alone or as a front-end to a larger system that includes an object recognition module 306 and an online labeling module 308 which have been described in the application to which this application is a Continuation-in-Part. The object recognition module 306 attempts to classify each object 302 to output a classification 310. If the object recognition module 306 is not sure of the object's classification, the system can be optionally configured to ask the user about the name of the object through use of an online labeling module 308.

Most of the work in the prior art has been in the area of feature-based saliency methods, such as that by Itti and Koch (see literature reference nos. 1 and 8), and object-based saliency methods, such as that by Orabona, et al. (see literature reference no. 7). However, both feature-based and object-based saliency methods have disadvantages. For example, Itti's feature-based method does not segment attended objects from the background and the attended regions returned by this algorithm have been shown to be variant under both translation and rotation of the scene (see literature reference no. 2). Such variance is not consistent with the natural performance of a biologically-inspired attention mechanism, where a simple variation such as a head tilt would not dramatically change the attention of a living creature. Also, although the feature-based paradigm uses an inhibition of return mechanism, there is no mechanism to guarantee that the same region will not be attended to multiple times. Orabona's object-based method is disadvantaged because it primarily uses color features to segment objects and compute saliency (see literature reference no. 7)

Alternatively, the saliency method according to the present invention uses an improved feature-based saliency method that is invariant under both rotation and translation of the scene. The method also employs a more pragmatic, object-based approach, which attends to each object only once. This method also improves upon the object-based saliency method of Orabona et al. because it includes intensity information in the feature set to explicitly account for color variations in a scene due to changes in lighting. Intensity features are processed separately from the color features to compute the saliency of an object. Thus, the attention and segmentation system 300 and underlying algorithms of the present invention provide improvements upon feature-based and object-based visual attention systems.

The visual system performs a rough segmentation on a scene based on the features it extracts. However, these do not correspond to entire objects or even to entire "blobs" of color as Orabona et al. asserts, but rather to feature variations, which may be affected by outside influences such as lighting conditions. Thus, the present invention can be applied to a large range of natural scenes exhibiting a variety of lighting conditions that cause problems for object-based attention systems.

The mechanism for attention can be applied in a bottom-up manner, where each of the different features contributes equally to the saliency, or in a top-down manner, which employs a goal-driven search that applies different weights to the features that compose the saliency based on their preference. This invention provides a training algorithm for computing the appropriate weights for top-down biasing of an object.

(4.1) Implementation
(4.1.1) Attention

The attention and segmentation system derives its inspiration from biologically-inspired visual saliency models of attention. The concept of object-based saliency and attention in biological visual systems is supported by a number of experiments, such as the "selective looking" experiment (see literature reference no. 14). The current system has several key features described below that makes it unique compared to previous work and significantly improves its performance.

Input to the attention and segmentation system 300 is any suitable input that includes a representation of an object in a scene, non-limiting examples of which include being in the form of static color images and video images. If black and white images are presented as input to the module, they are converted to an RGB color format (although they are still black and white images).

Figure 4:
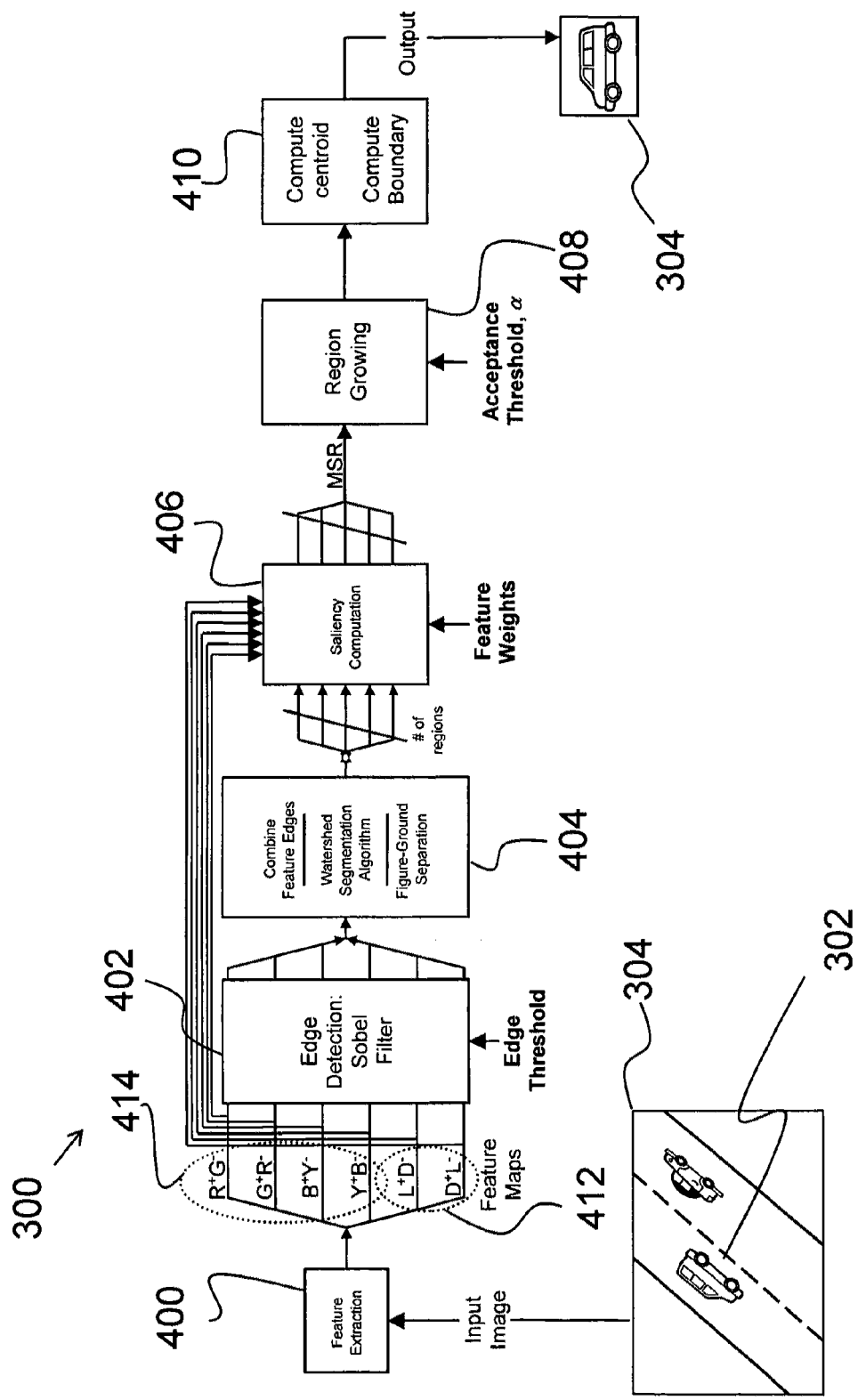
FIG. 4 a schematic diagram of the bio-inspired attention and object segmentation system according to the present invention.

FIG. 4 shows a schematic diagram of the bio-inspired attention and object segmentation system 300. The system is comprised of the following modules and algorithms: feature extraction 400, feature edge detection 402, watershed computation 404, saliency calculation 406, region growing 408, and feature boundary computation 410.

The current invention's feature extraction module 400 uses, for example, six features including two intensity channels 412, L and D (light and dark), and four fully-saturated color channels 414 (red (R), green (G), blue (B), and yellow (Y)). The two intensity channels 412, L and D, are calculated from the input image by averaging the red (r), green (g), and blue (b) channels: $L=(r+g+b)/3$ and $D=255-L$. Four fully-saturated color channels 414 are created (red (R), green (G), blue (B), and yellow (Y)) that yield zero-response to white, effectively separating the effects of the color and intensity channels:

$$R = r - \frac{(g+b)}{2}, G = g - \frac{(r+b)}{2},$$

$$B = b - \frac{(r+g)}{2}, \text{ and } Y = \frac{(r+g)}{2} - \frac{|r-g|}{2} - b.$$

All negative values are thresholded at zero. Feature opponency maps corresponding to the receptive fields in the retina for red-center/green surround, green-center/red-surround, blue-center/yellow-surround, bright-center/dark-surround, and dark-center/bright-surround are computed from the input channels from the Difference of Gaussians (DoG) between an "ON" center feature, and a contrasting "OFF" surround feature. Both the center and surround channels are convolved with a two-dimensional Gaussian kernel, where the surround kernel has larger bandwidth than the center kernel. Each opponent feature map is computed when the surround channel is subtracted from the center channel. This process is repeated for each center-surround channel pairing.

The feature edge detection module 402 computes the gradient information of each opponency map by convolving it with a filter (such as a Sobel filter), which extracts the edge information from each map. A master edge map, E, is computed by representing each pixel (x, y) by its maximum value across all of the edge maps in a winner-take-all fashion often exhibited by neural cells:

$$E(x,y) = \max\{E_{RG}(x,y), E_{GR}(x,y), E_{BY}(x,y), E_{YB}(x,y), E_{LD}(x,y), E_{DL}(x,y)\}.$$

The master edge map is processed by a watershed algorithm (i.e., watershed module 404), which completes the boundaries and closes the contours provided by the edge map and represents these regions as segmented proto-objects. According to research (see literature reference nos. 11 and 12), the phase differences between neighboring visual cortical neurons are believed to contribute to the segmentation of objects in a scene and perceptual grouping of "blobs." The watershed transform simulates these activities. Figure-ground separation is achieved by tagging those watershed regions that occupy a disproportionately large region of the image space as "background" and all others as foreground proto-objects. Segmented proto-objects that only occupy a small fraction of the scene (e.g., <2%) are discounted as noise.

Once the scene has been segmented into a grouping of proto-objects, the saliency calculation (i.e., by a saliency module 406) follows, in which the saliency of each is computed and ranked relative to the other proto-objects in the image. For each, the local neighborhood is represented by a rectangular bounding box surrounding the object whose area is three times larger than the object. The bottom-up saliency ($S_{BU}$) of a given proto-object is defined as:

$$S_{BU} = \sqrt{\sum_i (\Delta FEAT_i)^2},$$

where the contrast term $\Delta FEAT_i$ for the $i^{th}$ feature is computed as the difference between the average feature value within the object boundary and the average feature value of the object surround:

$$\Delta FEAT_i = \max\left( w_i \left( \langle FEAT_i \rangle_{object} - \langle FEAT_i \rangle_{surround} \right), 0 \right).$$

The angle brackets indicate the average operator. The value of w determines the weight of the $1^{th}$ feature and is the principle component of the top-down biasing mechanism of the system. Each object can only be attended to once, which has the same effect of an inhibition of return mechanism applied to the most salient object.

(4.1.2) Region Growing

The most salient region (MSR) is defined as the watershed region in the scene with the highest saliency value. The single feature that contributes most strongly to the saliency of the MSR is called the most salient feature (MSF).

Figure 5:
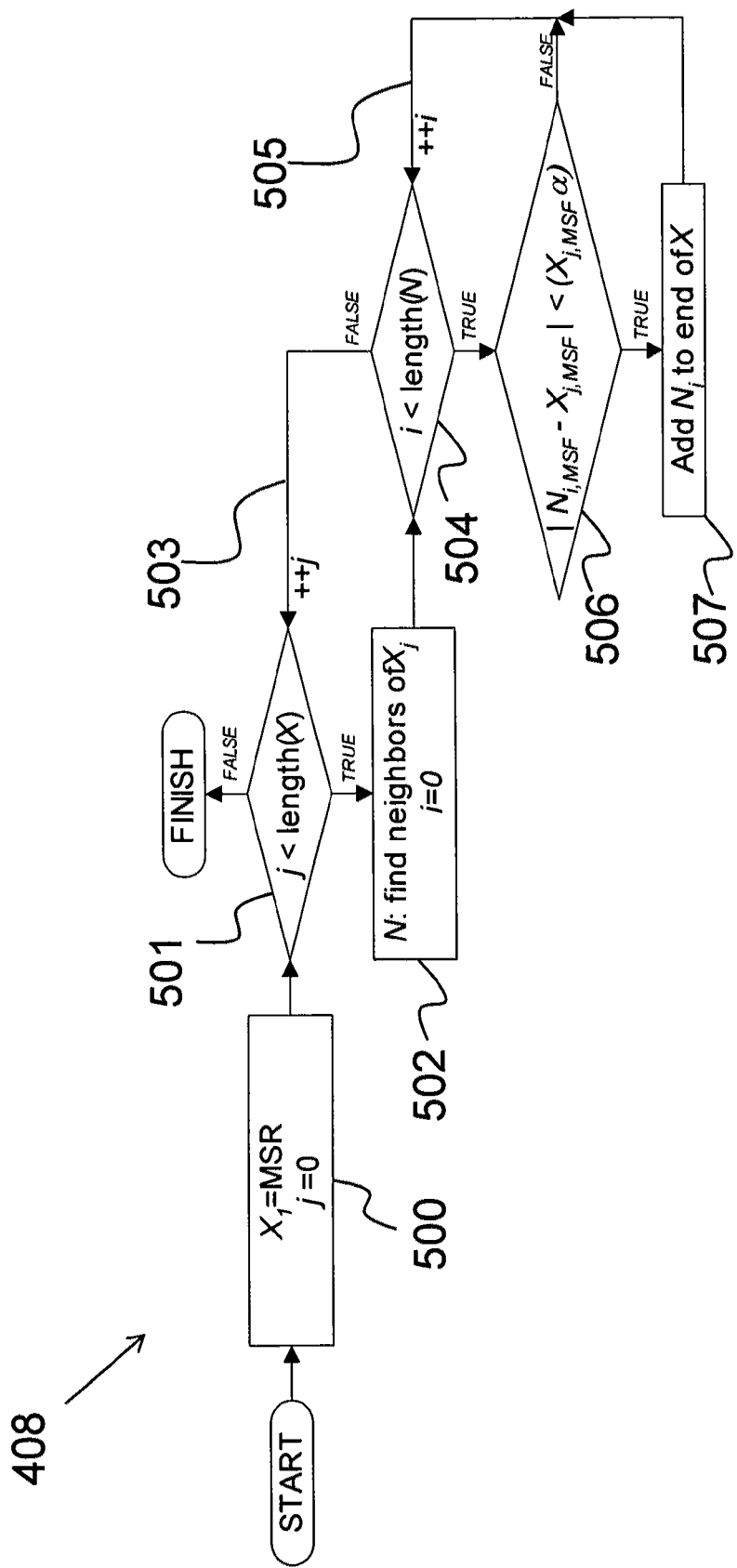
FIG. 5 is a schematic flowchart of a region growing algorithm according to the present invention.

Once the MSR has been found, the system enters a process of region growing (by a region growing module 408) in order to find the feature boundary of the object containing the MSR. FIG. 5 depicts a flowchart of the region growing module 408. The region growing module 408 includes an algorithm that creates a list, X, which contains all of the regions that compose the proto-object. Initially, this list comprises only the MSR.

Starting from the MSR 500 (the first item in list X), the region growing 408 algorithm finds all neighboring regions with nonzero saliency 502 and computes the relative difference between the MSF and the corresponding feature in the neighboring region. If this value (i.e., relative difference) falls below a certain threshold, a, 506, then the system determines that the new region and the MSR 500 belong to the same proto-object and this region is appended to the end of the list X 507. This list not only tells the algorithm which regions belong to the proto-object, but also which regions must be. This process is completed until all N neighboring regions have been examined (iterator 'i'). As depicted, the term "length (.)" refers to the length of the list in the parentheses (the number of elements in it). Thus, length (X) indicates the number of elements in list X and length (N) indicates the number of elements in list N. Additionally, "++j" means "take the value of 'j' and increase it by one" (i and j are both iterators that increase by 1 at the end of each loop). This operator is sometimes indicated by the expression "j←j+1."

Once the neighboring regions of the MSR have been either annexed or rejected, the algorithm finds all of the regions that neighbor the neighbors of the MSR. In short, the algorithm progresses through the regions in list X one at a time (iterator 'j'), determines the neighbors of that region, annexes or rejects the region 506, and appends those regions to the end of list X if they are not already in the list.

This process proceeds until the neighbors, neighbors' neighbors, et cetera, of the MSR have been evaluated and either annexed or rejected. This process is completed when all of the neighbors for each of the annexed regions in the list X have been evaluated. This permits the algorithm to determine a grouping of regions that share the dominant feature of the MSR whose boundary either represents regions whose features differ from the MSR or represents the beginning of a background region.

In other words, the region growing module 408 begins with an object that has been broken into regions and each region is tagged with a saliency value. The input is an image that is similar to that depicted in FIG. 6A. The list "X" contains all of the regions that belong to the object. The first element of this list is the MSR. At this point, a loop is initiated over the iterator "j," so the value of this variable is set to zero (as depicted by element 500).

The first decision box 501 is the control condition for the outer loop 503 (over "j"). As noted above, the term "length" indicates the length of the list X (i.e., the number of elements in the list). At this point, the list has just one element (the MSR), but since j is zero the answer is "TRUE," causing the system to proceed to the next box (as depicted by element 502).

The next box (i.e., element 502) refers to finding the neighboring regions to $X_j$. This is where the system identifies neighbors, then the neighbor's neighbors, etc., because this is a loop over the iterator j. In the first iteration, the value of $X_j$ is the MSR, so the system identifies the regions that are immediately adjacent to $X_j$. The term "neighbors" refers to "immediately adjacent and sharing a boundary," so regions that are near each other but that do not share a boundary are not "neighbors." The list of neighbors to the MSR is stored in another list, called "N."

At this point, the system prepares to enter into another loop with iterator "i" by initializing i to zero. The second decision box (depicted as element 504) is the controller for the second loop 505. The second decision block 504 looks at each element in the list N (the neighbors) and runs the test on each one. The second loop 505 is continued until it has checked every element in the list. The i=0, decision box, and ++i are all part of a single programming block called a "for" loop, which runs a block of code for a fixed number of iterations and then exits.

The third decision block (depicted as element 506) determines whether the adjacent (neighbor) region should be grouped with the MSR or not by using a similarity threshold. If the neighbor region is determined to be within a predetermined similarity threshold, then the neighbor region is added to the end of list X (i.e., element 507). Originally this list contains just the MSR, but grows through this process. If the region does not get grouped with the MSR, then the region is ignored and discarded. This process is repeated for every neighboring region "$N_i$." After all of the neighboring regions have been looked at (i.e., the value of i exceeds the length of the list of neighbors), then this loop terminates.

At this point, the system has looked at all of the regions adjacent to the MSR and has determined which ones are similar to the MSR, with the similar regions added to the end of list "X." Next, the system looks at the regions adjacent to those new regions and decides whether or not they belong in the object. Now that the system is done with the MSR, "j" is increased, which simply means that the system looks at the next region in the list X.

Using this new region (i.e., the next region in the list X), the process is repeated. The system searches for neighbors (which are placed in list "N"), determines if each neighbor is similar, and if it is, then groups the neighbor as part of the object and adds it to the list "X." Initially, list "X" grows very quickly by adding many new regions. However, as the process continues, an increasing number of regions are rejected because the system begins to identify the edge of the object. Eventually, the system is able to check every region in the list "X," at which point the value of "j" is larger than the length of the list. This triggers the "FALSE" statement in the first decision block (element 501) and ends the program.

Thus, the first two decision boxes (i.e., element 501 and element 504) are parts of loops, and the third decision box (i.e., element 506) is actually inside another loop (a loop within a loop). The search procedure is meticulous because the search may have to proceed through four or five layers of regions (or more) from the MSR to finally find the edge of the object.

For example, in FIG. 6A (described below), the MSR appears to be the large region to the left of the object. However, it is shown that the object boundary on the right is about six layers removed from the MSR. The algorithm looks at the regions immediately adjacent to the MSR, sees that they are all approximately the same color (except for the background), and includes them in the object. Now it needs to progress to the next level. The regions that are adjacent to each of the newly added neighbors is examined, found to be approximately the same color, and added again. This process continues until it examines the regions at the right of the object. At this point, there are no more neighbors to look at (i.e., all adjacent regions are either part of the background or already included as part of the object). At this point, the search terminates because all possible regions have been analyzed and either accepted or rejected.

Thus, the current system is similar to viewing a stained-glass window, or the fragments within a mosaic pattern. The viewer's attention immediately shifts to a fragment in a largely feature-based manner due to a saliency cue within that location. Next, the visual signal propagates to neighboring regions that share similar features. The propagation continues until a feature boundary has been discovered, and the resulting group of similarly featured fragments is classified as a proto-object. An object of uniform color that is subject to external lighting can exhibit a color gradient across its surface. The method according to the present invention is able to combine constituent regions of an object into a single object, although technically, the regions are different colors.

Figure 6B:
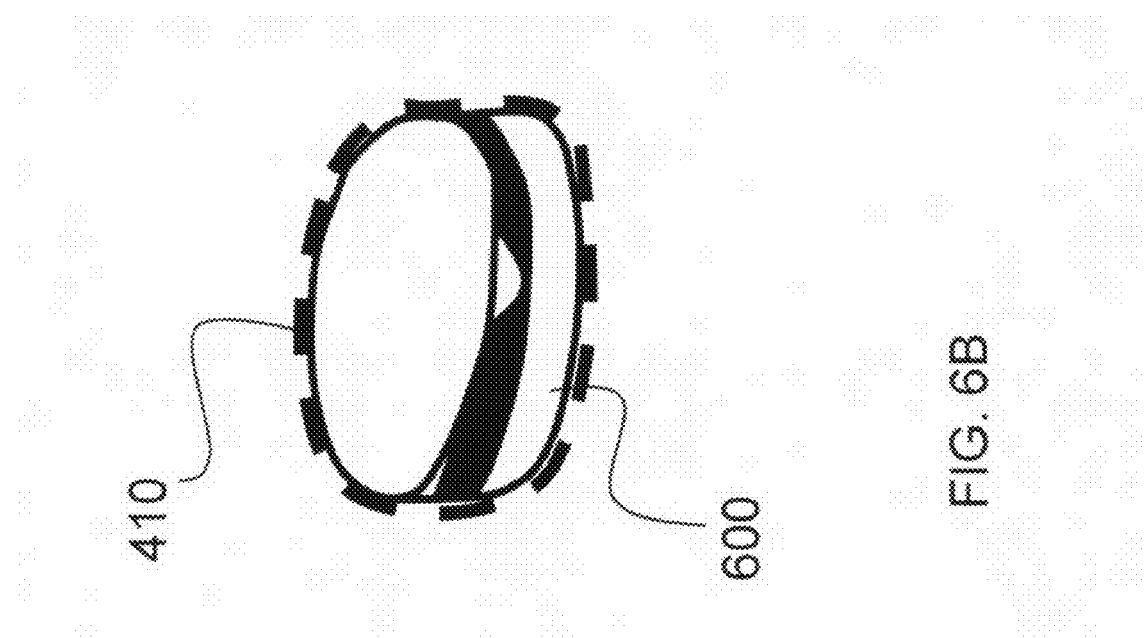
FIG. 6B is an illustration of a feature boundary of an object according to the present invention, obtained from region growning.
Figure 6A:
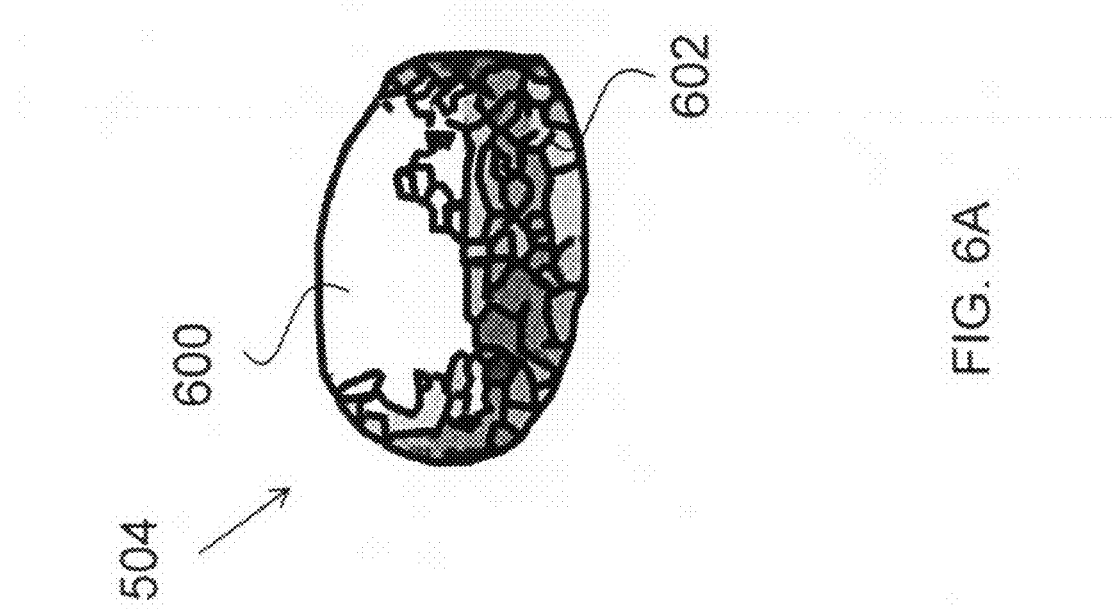
FIG. 6A is an illustration of an object from watershed regions according to the present invention, prior to region growing.

For further illustration, FIGS. 6A and 6B illustrate region growing of a cheeseburger 600 from watershed regions 602. Each object is broken down into multiple regions 602 by the watershed algorithm based on lighting, shading, and other color differences, as shown in FIG. 6A. The region growing algorithm combines similar pieces along the MSF 504 and represents them as a single object for segmentation, indicated by the feature boundary 410 that outlines the object in FIG. 6B. At this point, the feature boundary 410 is clearly established and all similar watershed regions in the neighborhood have been joined together. The system applies inhibition of return to all annexed regions, computes the feature boundary 410 and centroid of this region and continues to the next salient point. This process continues until either all watershed regions 602 have been attended to or a user-specified maximum number of attention shifts has been performed. This process can be performed on objects of any size.

In summary, the system 300 computes the saliency map of the objects in a scene and performs ordered segmentation of the salient objects. It attends to the most salient object in a scene, computes the feature boundary 410 of the object, and returns the centroid of the object and a list of the pixels in the image that make up its feature boundary 410. The feature boundary 410 is drawn tightly around the object, and is not a bounding box or a vague ellipsoidal region. The system repeats this process until either a predefined maximum number of attention shifts has been performed or all objects in the scene have been attended to. The system will not revisit previously attended objects, ensuring that the attention mechanism performs efficiently.

(4.1.3) Top-Down Biasing

In top-down biasing, each feature of an object is assigned a given weight, which allows one to manipulate the importance of each feature for the saliency calculation 406. In the bottom-up case, the feature weights are set to a default value: 1.0 for the color channels and 0.5 for the intensity channels. In the top-down case, the proper feature weights to attend to the features of a given target are computed using a separate module than the attention module. The training algorithm takes a series of target images and masks from a training set as its input. For each target image in the set, the training algorithm computes an average response for each feature. The weight of each feature, $w_i$, is computed as the relevance of the feature based on the mean, $u_i$, and standard deviation, $\sigma_i$, of the occurrence of the feature:

$$w_i = w_0 \frac{u_i}{1+\sigma_i},$$

where $w_0$ represents the default (bottom-up) weight for a given feature. The algorithm ensures that features common to all items in the training set will be given a preference over those that are less common, which can be caused by lighting and other visual anomalies. Similarly, biasing for distinct features that exist in a specific target greatly increases the probability that the attention system will attend to that specific target prior to any other objects in a scene.

Figure 7:
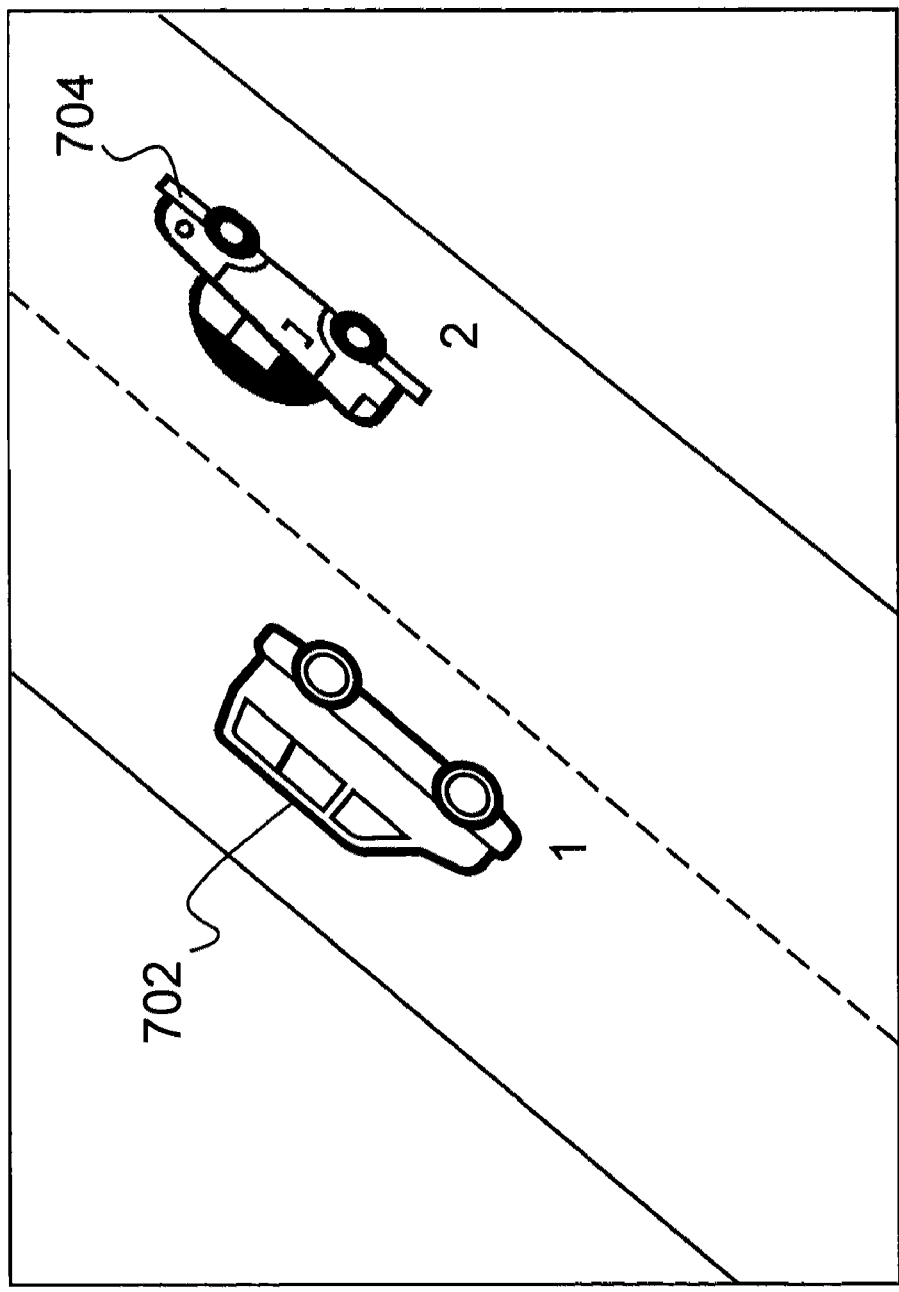
FIG. 7 is an illustration of an image that includes an example of a scene with a first car and a second car.

In the top-down biasing of an object, specific feature cues are used so that objects containing that feature draw more attention. Executing the system in a top-down manner can allow it to process scenes faster, if such cues are available. For example, if one wishes to tune the system to detect red cars in a given scene, it will use this information to make red objects more salient than if bottom-up mode were run. FIG. 7 is an illustration of a static state image 700 that includes a scene with a first car 702 and a second car 704. Although for purposes of patent office procedure the drawings are depicted as black and white, one can imagine the image 700 as being an actual color image where the first car 702 is white and the second car 704 is another color, such as red. Thus, in this example, if the image was biased for the color red, the red car (i.e., second car 704) would have a higher saliency than the white car (i.e., the first car 702).

(5) Biological and Neurological Inspiration

The concept of object-based saliency and attention in biological visual systems is supported by a number of experiments, including the "selective looking" experiment (see literature reference no. 14). These experiments assert that visual attention focuses on cohesive regions in space corresponding to objects and feature-uniform proto-objects, and not on specific spatial locations (i.e., pixels).

The feature extraction used in the experiment is completely biologically-inspired. A color image is broken into its constituent color channels and an intensity channel, similar to rod and cone cells in the retina of an eye. Biologically-faithful feature opponency maps corresponding to the receptive fields in the retina for red-center/green-surround, green-center/red-surround, blue-center/yellow-surround, bright-center/dark-surround, and dark-center/bright-surround are computed as the difference between a fine scale (center) and a coarse scale (surround). The combination of these features into a saliency map via nonlinear summation is analogous to saliency computations that take place in the pulvinar, the superior colliculus, and the intraparietal sulcus (see literature reference no. 1).

To compute the segmentation of objects in a scene and the perceptual grouping of "blobs," the phase differences between neighboring visual cortical neurons are used to determine the feature boundaries (see literature references no. 11 and 12). This is equivalent to using a Sobel filter of the present invention and maximizing over a feature set to compute a master edge map. The watershed transform of the present invention simulates the parallel spread of the neural activation on the image (see literature reference no. 7). Joining regions along the MSF and the propagation of the saliency signal along its neighbors is consistent with findings in object-based and Gestalt psychology, which indicate that regions that are either similar to one another or belong to the same object representation are attended to at the same time as a group. When presented with the properly-arranged parts of an object, a viewer will recognize the object itself, and not a combination of the object's individual parts. The method of region growing is inspired by the idea of synaptic plasticity between lateral neurons. Cells that respond similarly to the same stimulus strengthen their connections to one another and begin to behave as a cohesive unit. In the proposed invention, cells that are similarly excited by the same feature are connected in order to share the same saliency and object boundary.

(6) Experimental Results

As can be appreciated by one skilled in the art, the experimental results herein are provided for illustrative purposes only to demonstrate the operability of the present invention and the invention is not intended to be limited thereto. The proposed invention was tested against a variety of benchmark data sets of natural images in an attempt to demonstrate the effectiveness of the bottom-up and top-down attention systems, and the object segmentation algorithm. The data sets include images from the Columbia Object Image Library (COIL)-100 dataset (see literature reference no. 13), the University of California at San Diego (UCSD) data set (see literature reference no. 15), and a number of satellite images obtained from Google Earth™. Google Earth™ is produced by Google, Inc., located at 1600 Amphitheatre Parkway Mountain View, Calif. 94043. The array of images shows how the present invention performs across a wide class of scenes.

The COIL-100 data set consists of a set of 100 objects photographed against a black background. For the first experiment, a series of training data was constructed by choosing an object from the set and constructing a series of twenty-five test images at 800×600 resolution and at various orientations and scales. A set of masks were created and the system was trained to compute a weighting vector for top-down biasing. For testing, a series of images were generated consisting of between four and seven randomly selected objects (plus the target object) from the image database at random scales and orientations. The system computed the attention and segmentation for the three most salient points for each in a bottom-up and top-down manner.

Figure 8:
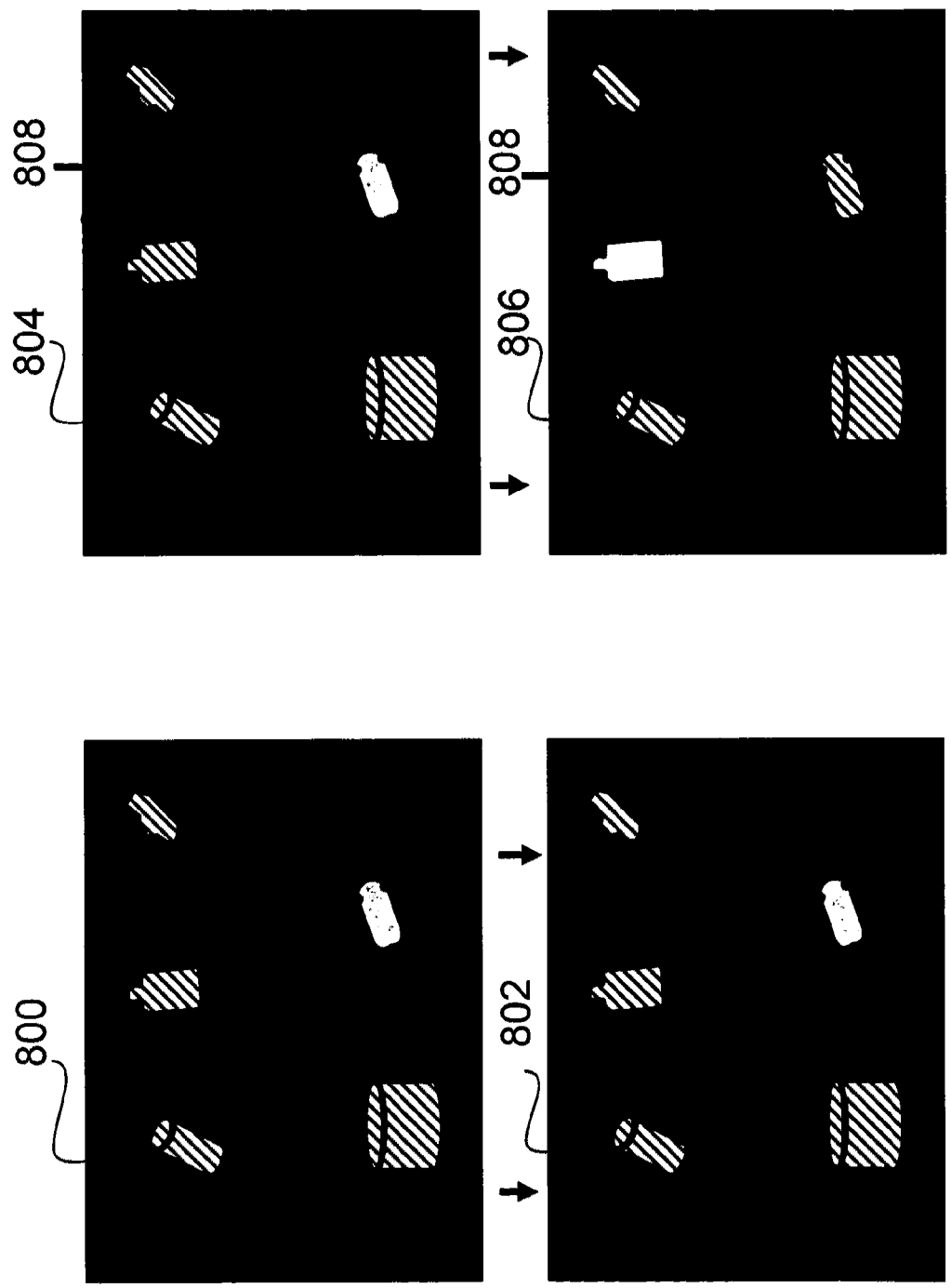
FIG. 8 is an illustration of bottom-up and top-down attention sequence images that include multiple objects.

The results of the experiment performed in a bottom-up manner and top-down manner are shown in FIG. 8. As can be appreciated, although black and white drawings are illustrated, the actual scene that was created included real (actual) images of the COIL-100 objects. The first image 800 shows the unbiased, bottom-up attention sequence for a group of COIL objects at randomly selected orientations and scales. The second image 802 shows the resulting saliency map corresponding to the bottom-up trial. The lighter regions in the image 802 exhibit higher saliency than the darker regions. The third image 804 shows the attention sequence for a group of COIL objects at randomly selected orientations and scales after it has been biased to target the rectangular bottle 808. The fourth image 806 shows the resulting saliency map corresponding to the top-down trial. Top-down biasing in this manner dramatically affects the attention of the system, as illustrated by the shift in the saliency maps, where the saliency of the targeted rectangular bottle 808 has risen sharply and is the most salient object in the top-down saliency map 806, as compared to the bottom-up saliency map 802, while the relative saliencies of the other objects have decreased.

Figure 9:
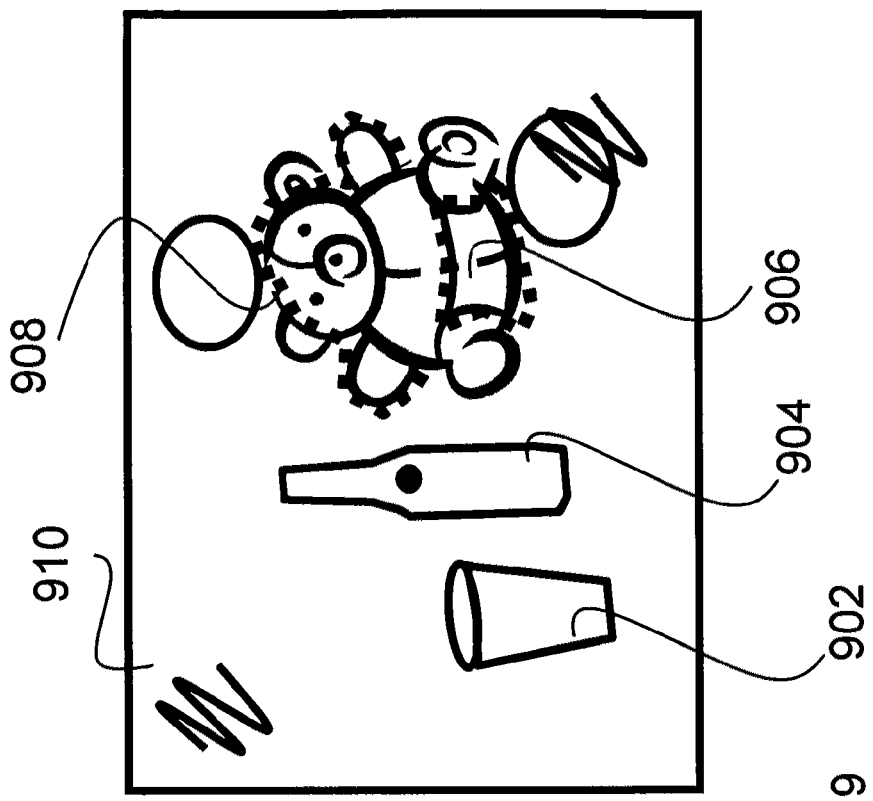
FIG. 9 is an illustration of bottom-up and top-down attention sequence images that include multiple objects.
Figure 9:
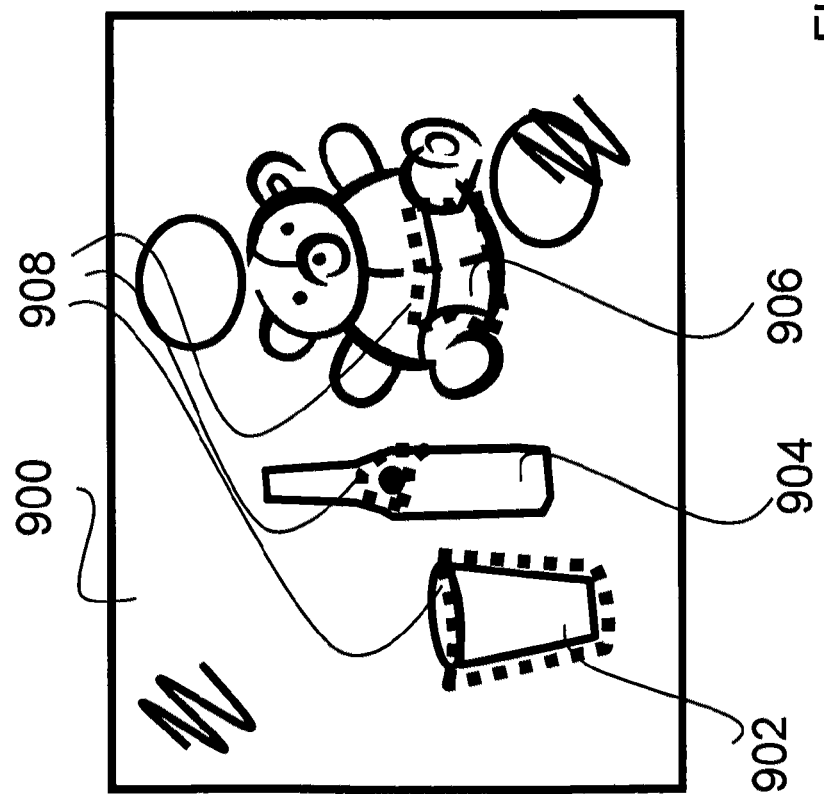

The next experiment applied the proposed invention to the UCSD image data set, which exhibits both occlusion and texture anomalies caused by lighting. These scenes in these images consist of various multicolored objects scattered about the image space. A training data set was constructed by compiling a series of images with a single prominent target and constructing image masks for each. A top-down weighting vector was computed and the bottom-up and top-down attention for the images were computed, as shown in FIG. 9. Each of these cases resulted in precise segmentation of colored proto-objects consisting of multiple watershed regions.

The first image 900 in FIG. 9 shows the bottom-up attention sequence of the image and corresponding segmentations. As can be appreciated, although black and white drawings are illustrated, the actual scene that was created included real (actual) images of the UCSD objects. Hues that are unique to the image, such as red in a red cup 902, green in a green bottle 904, and yellow in a yellow bear plush toy 906, are preferred. The attention algorithm of the present invention locates and segments each of the objects. The boundaries 908 found are represented, in this illustration, by a dashed outline.

The second image 910 in FIG. 9 shows the attention sequence after biasing it to find the bear plush toy 906, which is yellow. There is a shift in preference to yellow and orange hues that allow the algorithm to find the bear plush toy 906 in the first few shifts. The segmentation follows the feature contours, which may or may not correspond to a complete object. The boundaries 908 found are represented, in this illustration, by a dashed outline.

Figure 10:
FIG. 10 is a table showing the results of the bottom-up and top-down biasing algorithm to find each of the target objects in three attention shifts or less for the images constructed from a Columbia Object Image Library (COIL) dataset and the University of California, San Diego (UCSD) dataset.

As shown in FIG. 10, the table 1000 shows the results of bottom-up and top-down biasing algorithm to find each of the target objects in three attention shifts or less for the images constructed from the COIL dataset and the UCSD dataset. Each column represents the success rate of the system to find the object on the numbered shift. In each case, top-down biasing the attention system had a dramatic effect on the target-attention success rate. The attention system was biased for five different objects, and the system's ability to find the target on one of the first three shifts was compared to the results of an untrained bottom-up attention system. Biasing the system dramatically increases the ability of the system to find the trained object in one of the first three shifts.

Figure 11:
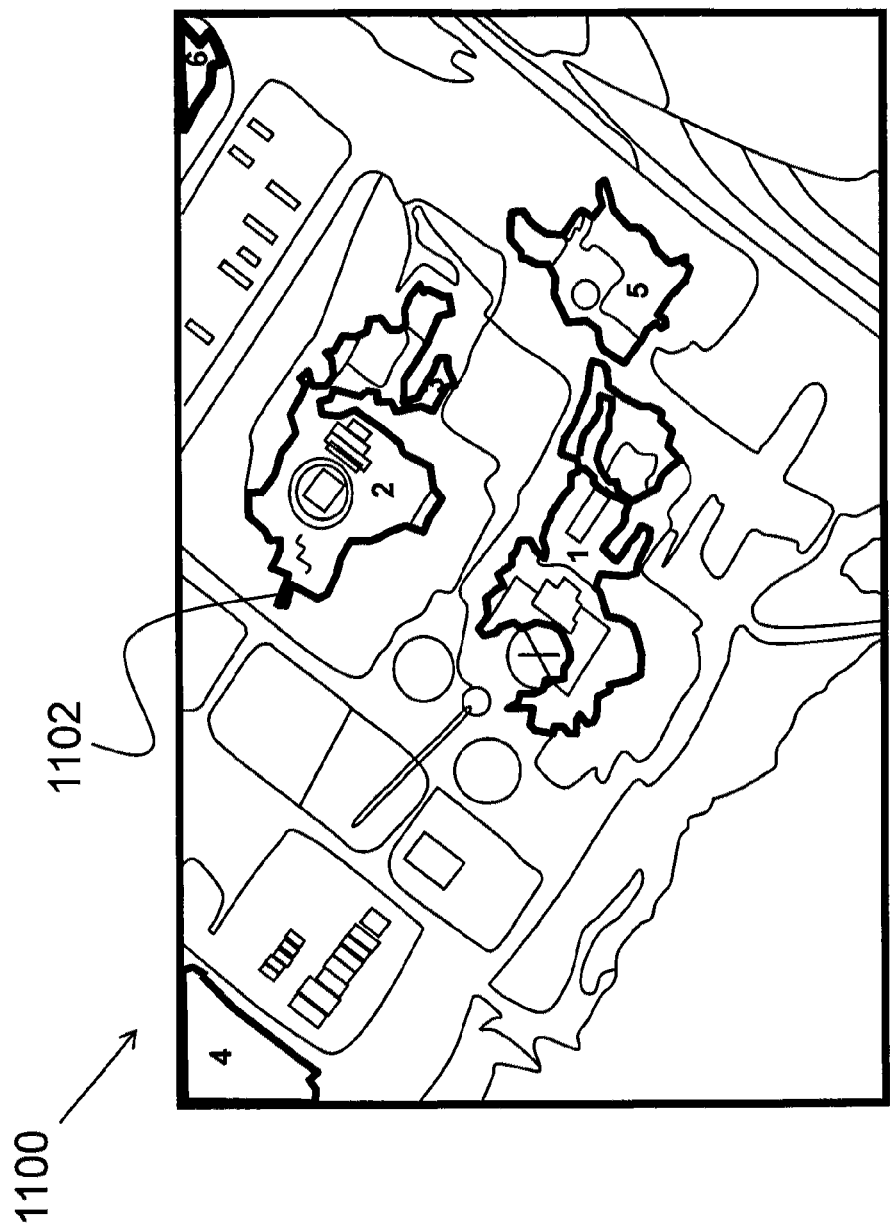
FIG. 11 is an image showing bottom-up attention results according to the present invention.

FIG. 11 shows bottom-up attention results performed on a satellite photograph 1100 obtained from Google Earth™. FIG. 11 is a black and white photograph and not a black and white drawing because the photograph is the only practical medium for illustrating the claimed invention's results as performed on satellite photographs. In each case, the algorithm is able to find and accurately segment the artificial parts of the terrain, which are salient against the natural background. Objects such as roads, buildings, and airplanes are very salient, making this a useful tool for aerial surveillance. The boundaries 1102 of the most salient objects found are represented by a solid outline in this image.

Figure 12B:
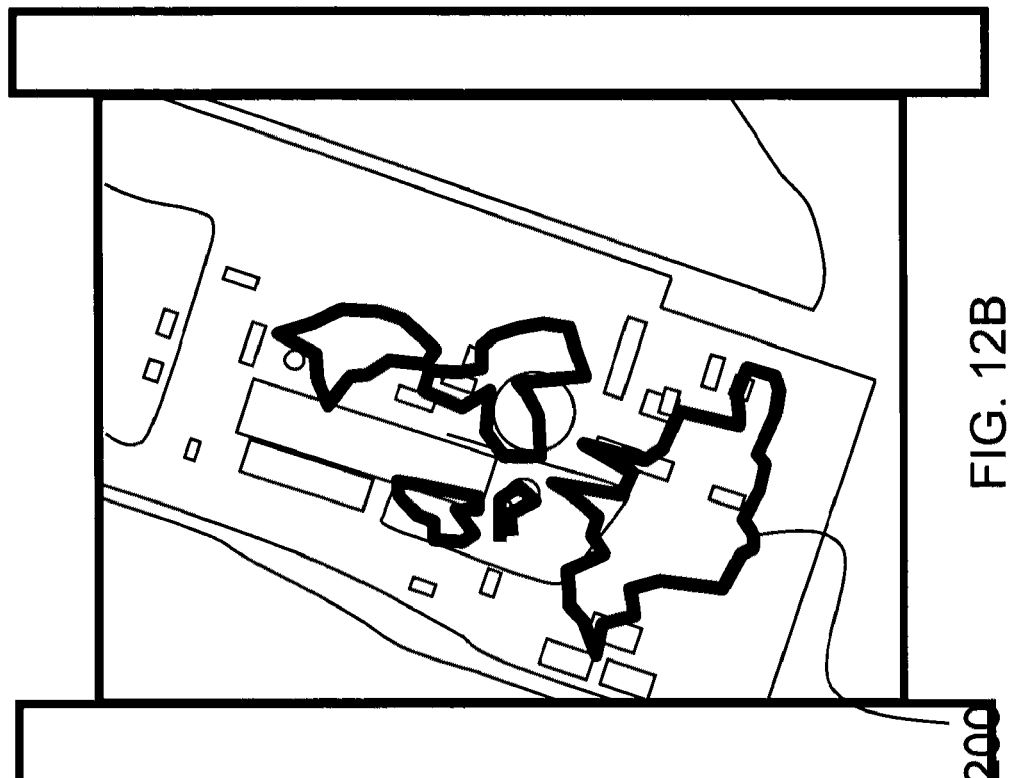
FIG. 12B is an example of the image showing a finer scale than that of FIG. 12A, illustrating the effect of changing the watershed parameters to adjust the segmentation scale according to the present invention.
Figure 12A:
FIG. 12A is an example of an image showing a coarse scale used for a cursory exploration of an area.

FIGS. 12A and 12B show the effect of changing the watershed parameters to adjust the segmentation scale, performed on satellite photographs obtained from Google Earth™. By adjusting the edge and acceptance thresholds, the grain of the watershed segmentation is modulated and affects the scale of object segmentation. A coarse scale, as shown in FIG. 12A, can be used for a cursory exploration of an area, to determine if anything is out of the ordinary or to identify objects that are well-known to the system. A finer scale, as shown in FIG. 12B, can be used to "take a closer look" at a suspicious region or to learn about a new object by identifying its constituent parts. The boundaries 1200 found are represented, in this illustration, by a solid outline.

(6) Conclusion

The present invention is a system for attention and object segmentation, functionally inspired by findings in the neurosciences. The attention module can work in both a bottom-up and a top-down mode, the latter allowing for directed searches for specific targets. The region growing module used for object segmentation requires very little user interaction, and has been shown to work under a variety of natural scenes that would be problematic for traditional object segmentation algorithms. Furthermore, the scale of the segmentation can be manipulated based on the desired task of the attention system. The system can be used by itself for stand-alone searching for salient objects in a scene, or as the front-end of an object recognition and online labeling system.

What is claimed is:

1. A vision system for object-based attention and segmentation, comprising a memory and one or more processors, the memory encoded with instructions to cause the system to include:
   a feature extraction module configured to receive an image representing a scene with an object in the scene and generate a feature map corresponding to receptive fields in the retina for red-center/green-surround, green-center/red-surround, blue-center/yellow-surround, bright-center/dark-surround, and dark-center/bright-surround;
   a feature edge detection module configured to extract edge information from the feature map and generate an edge map, the edge map including incomplete boundaries and unclosed contours;
   a watershed module configured to generate proto-objects based on the edge map;
   a saliency module configured to compute a saliency of each proto-object and rank the proto-objects relative to other proto-objects in terms of their saliency; and
   a region growing module configured to compute a feature boundary for the proto-object with the highest saliency and a list of pixels in the image that constitutes the proto-object feature boundary, and further configured to output the pixels confined by the feature boundary as an extracted object.

2. A vision system as set forth in claim 1, further comprising a top-down biasing module configured to assign a given weight to each feature of the object, the weight being used by the saliency module in computing the saliency.

3. A vision system as set forth in claim 2, further comprising an object recognition module configured to receive the extracted object and associate a label with the extracted object to classify the object, whereby a user can use the vision system to classify an object.

4. A vision system as set forth in claim 3, further comprising an online labeling module, the online labeling module configured to alert a user if the extracted object is an unknown object and prompt the user to input a label for the unknown object.

5. A vision system as set forth in claim 4, wherein the edge-detection module further comprises an edge threshold, whereby changing the edge threshold varies a number of watershed-regions being generated by the watershed module.

6. A vision system as set forth in claim 1, further comprising an object recognition module configured to receive the extracted object and associate a label with the extracted object to classify the object, whereby a user can use the vision system to classify an object.

7. A vision system as set forth in claim 1, further comprising an online labeling module, the online labeling module configured to alert a user if the extracted object is an unknown object and prompt the user to input a label for the unknown object.

8. A vision system as set forth in claim 1, wherein the edge-detection module further comprises an edge threshold, whereby changing the edge threshold varies a number of watershed-regions being generated by the watershed module.

9. A vision system as set forth in claim 1, wherein:
in receiving an image and generating a feature map, the feature extraction module is configured to receive an image frame representing a scene with an object in the scene and generate a series of feature maps for each image frame, the series of feature maps corresponding to specific visual features in the scene such that a single feature map is generated for each visual feature processed;
in extracting edge information, the feature edge detection module is configured to receive as an input actual feature maps and extract edge information from the feature maps to generate an edge map, the edge map includes incomplete boundaries and unclosed contours; and
in generating proto-objects based on the edge map, the proto-objects are generated by completing boundaries and closing contours.

10. A computer program product for visual object-based attention and segmentation, the computer program product comprising computer-readable instruction means stored on a non-transitory computer-readable medium that are executable by a computer for causing the computer to:
receive an image representing a scene and generate feature maps corresponding to receptive fields in the retina for red-center/green-surround, green-center/red-surround, blue-center/yellow-surround, bright-center/dark-surround, and dark-center/bright-surround;
receive the feature maps and generate a master edge map using the feature maps;
receive the master edge map and generate a plurality of watershed-regions, each watershed-region having a plurality of features;
receive the plurality of watershed-regions and compute a plurality of saliencies corresponding to each watershed-region;
select among the plurality of watershed-regions a most-salient-region; and
receive the watershed-regions and grow the most-salient-region by joining neighboring watershed-regions to form a proto-object, the proto-object having a feature boundary;
generate a list of pixels in the image that constitutes the proto-object feature boundary; and
output the pixels confined by the feature boundary as an extracted object.

11. A computer program product as set forth in claim 10, further comprising instruction means for causing a computer to assign a given weight to each feature of the object, the weight being used by the saliency module in computing the saliency.

12. A computer program product as set forth in claim 11, further comprising instruction means for causing a computer to receive the extracted object and associate a label with the extracted object to classify the object, whereby a user can use the vision system to classify an object.

13. A computer program product as set forth in claim 12, further comprising instruction means for causing a computer to alert a user if the extracted object is an unknown object and prompt the user to input a label for the unknown object.

14. A computer program product as set forth in claim 13, further comprising instruction means for causing a computer to operate with an edge threshold, such that changing the edge threshold varies a number of watershed-regions being generated by the watershed module.

15. A computer program product as set forth in claim 10, further comprising instruction means for causing a computer to receive the extracted object and associate a label with the extracted object to classify the object, whereby a user can use the vision system to classify an object.

16. A computer program product as set forth in claim 10, further comprising instruction means for causing a computer to alert a user if the extracted object is an unknown object and prompt the user to input a label for the unknown object.

17. A computer program product as set forth in claim 10, further comprising instruction means for causing a computer to operate with an edge threshold, such that changing the edge threshold varies a number of watershed-regions being generated by the watershed module.

18. A computer program product as set forth in claim 10, wherein:
in receiving an image and generating a feature map, an image frame representing a scene is received and a series of feature maps are generated, such that a single feature map is generated for each of the receptive fields;
in receiving the feature maps and generating a master edge map corresponding to the feature maps, the edge map includes incomplete boundaries and unclosed contours; and
in receiving the watershed-regions and growing the most-salient-region by joining neighboring watershed-regions to form a proto-object, the proto-object is formed through completing boundaries and closing contours.

19. A method for bio-inspired visual object-based attention and segmentation comprising acts of:
receiving an image representing a scene and generating feature maps corresponding to receptive fields in the retina for red-center/green-surround, green-center/red-surround, blue-center/yellow-surround, bright-center/dark-surround, and dark-center/bright-surround;
receiving the feature maps and generating a master edge map using to the feature maps;
receiving the master edge map and generating a plurality of watershed-regions, each watershed-region having a plurality of features;
receiving the plurality of watershed-regions and computing a plurality of saliencies corresponding to each watershed-region;
selecting among the plurality of watershed-regions a most-salient-region; and
receiving the watershed-regions and growing the most-salient-region by joining neighboring watershed-regions to form a proto-object, the proto-object having a feature boundary;
generating a list of pixels in the image that constitutes the proto-object feature boundary; and
outputting the pixels confined by the feature boundary as an extracted object.

20. A method as set forth in claim 19, further comprising an act of assigning a given weight to each feature of the object, the weight being used by the saliency module in computing the saliency.

21. A method as set forth in claim 20, further comprising an act of associating a label with the extracted object to classify the object, whereby a user can use the vision system to classify an object.

22. A method as set forth in claim 21, further comprising acts of alerting a user if the extracted object is an unknown object and prompting the user to input a label for the unknown object.

23. A method as set forth in claim 22, further comprising an act of operating with an edge threshold, such that changing the edge threshold varies a number of watershed-regions being generated by the watershed module.

24. A method as set forth in claim 19, further comprising an act of associating a label with the extracted object to classify the object, whereby a user can use the vision system to classify an object.

25. A method as set forth in claim 19, further comprising acts of alerting a user if the extracted object is an unknown object and prompting the user to input a label for the unknown object.

26. A method as set forth in claim 19, wherein:
in receiving an image and generating a feature map, an image frame representing a scene is received and a series of feature maps are generated, such that a single feature map is generated for each of the receptive fields;
in receiving the feature maps and generating a master edge map corresponding to the feature maps, the edge map includes incomplete boundaries and unclosed contours; and
in receiving the watershed-regions and growing the most-salient-region by joining neighboring watershed-regions to form a proto-object, the proto-object is formed through completing boundaries and closing contours.

27. A method as set forth in claim 26, further comprising an act of operating with an edge threshold, such that changing the edge threshold varies a number of watershed-regions being generated by the watershed module.

* * * * *